(12) United States Patent
Ho et al.

(10) Patent No.: US 11,661,304 B2
(45) Date of Patent: *May 30, 2023

(54) TUBE STRUCTURE

(71) Applicant: Sonoco Development, Inc., Hartsville, SC (US)

(72) Inventors: Kwang-Wei Ho, Taoyuan (TW); Hsiang-Shou Hsu, Tongluo Township (TW)

(73) Assignee: Sonoco Development, Inc., Hartsville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,648

(22) Filed: Oct. 26, 2022

(65) Prior Publication Data

US 2023/0044190 A1 Feb. 9, 2023

Related U.S. Application Data

(63) Continuation of application No. 17/201,472, filed on Mar. 15, 2021, now Pat. No. 11,518,645.

(51) Int. Cl.
 B65H 75/10 (2006.01)

(52) U.S. Cl.
 CPC ......... B65H 75/10 (2013.01); *B65H 2405/40* (2013.01)

(58) Field of Classification Search
 CPC .................................................. B65H 75/10
 See application file for complete search history.

(56) References Cited

U.S. PATENT DOCUMENTS

| | | | | |
|---|---|---|---|---|
| 1,524,483 A * | 1/1925 | Lowe | ...................... | B65H 75/10 242/613.5 |
| 2,223,682 A * | 12/1940 | Gammeter | ............. | B65H 75/10 242/613.5 |
| 4,754,537 A * | 7/1988 | Lee | ........................ | B65H 75/10 264/DIG. 68 |
| 5,265,812 A * | 11/1993 | Holopainen | ......... | D21G 1/0206 242/613 |
| 5,535,961 A | 7/1996 | Duckworth et al. | | |
| 5,816,525 A * | 10/1998 | De Roeck | ............. | B65H 75/18 242/613 |
| 5,908,173 A | 6/1999 | De Roeck | | |
| 11,407,214 B2 * | 8/2022 | Lemieux | ................... | B32B 5/18 |
| 11,518,645 B2 * | 12/2022 | Ho | ......................... | B65H 75/10 |
| 2005/0184191 A1 * | 8/2005 | van de Camp | ........ | B65H 75/30 242/613 |

(Continued)

FOREIGN PATENT DOCUMENTS

| JP | 09300488 A | 11/1997 |
|---|---|---|
| JP | 2011218557 A | 11/2011 |

OTHER PUBLICATIONS

International Search Report and Written Opinion related to Application No. PCT/US2022/014542; reported on May 6, 2022.

*Primary Examiner* — William A. Rivera
(74) *Attorney, Agent, or Firm* — von Briesen & Roper, s.c.

(57) ABSTRACT

A lightweight tube structure capable of high loading is provided. The tube structure comprises an inner tube and an outer tube with an annular space being formed between the outer tube and the inner tube; a first paper ring and a second paper ring fitted at two ends of the annular space respectively. A foamed body may be disposed in the annular space, the foamed body being supported between the outer tube and the inner tube. The structure enables the tube to retain a light weight and can also enhance the loading strength of the tube, thus achieving the substantial effect of preventing deformation.

7 Claims, 3 Drawing Sheets

(56) References Cited

U.S. PATENT DOCUMENTS

2008/0217464 A1 9/2008 Ridgeway et al.
2022/0250306 A1* 8/2022 Davis .................. B29C 53/825

* cited by examiner

TUBE STRUCTURE

CROSS REFERENCE TO RELATED APPLICATION

This application is a continuation of U.S. application Ser. No. 17/201,472, filed Mar. 15, 2021. U.S. application Ser. No. 17/201,472 is incorporated here by reference in its entirety to provide continuity of disclosure.

FIELD OF THE INVENTION

The present disclosure relates to a lightweight paper tube structure capable of high loading, in particular one that is capable of retaining a light weight while enhancing the loading strength of the paper tube.

DESCRIPTION OF THE RELATED ART

Tubes and cores made of thermoplastics or paper may be used to hold wound materials such as sheet materials or strand materials. These materials can exert a relatively high radial pressure (load) on the core which can lead to undesirable deflection, distortion, buckling, crushing or other types of deformation of the core. It is desirable to have a tube and core with high loading capabilities but that is still lightweight.

BRIEF SUMMARY OF THE INVENTION

A lightweight tube structure capable of high loading is provided, the tube structure comprising an inner tube and an outer tube, the external diameter of the inner tube being less than the internal diameter of the outer tube, such that an annular space is formed between an internal circumferential surface of the outer tube and an external circumferential surface of the inner tube; a first paper ring and a second paper ring, the first paper ring and the second paper ring being fitted at two ends of the annular space respectively such that the two ends of the annular space are closed. An annular foamed body may be provided in the annular space, the annular foamed body being supported between the internal circumferential surface of the outer tube and the external circumferential surface of the inner tube. Multiple fasteners such as fixing nails may be provided, separately nailed or otherwise affixed to the first paper ring, the inner tube and the outer tube, such that the first paper ring, the inner tube and the outer tube are fastened together securely as a unit; and separately nailed or otherwise affixed to the second paper ring, the inner tube and the outer tube, such that the second paper ring, the inner tube and the outer tube are fastened together securely as a unit.

The tube structure described above enables the paper tube to retain a light weight, and can also enhance the loading strength of the paper tube, thus achieving the substantial effect of preventing deformation.

DETAILED DESCRIPTION OF THE INVENTION

In order that the reader can have a deeper understanding of the tube structure, a representative embodiment is set out here and described in detail below in conjunction with the drawings.

Figure 1:
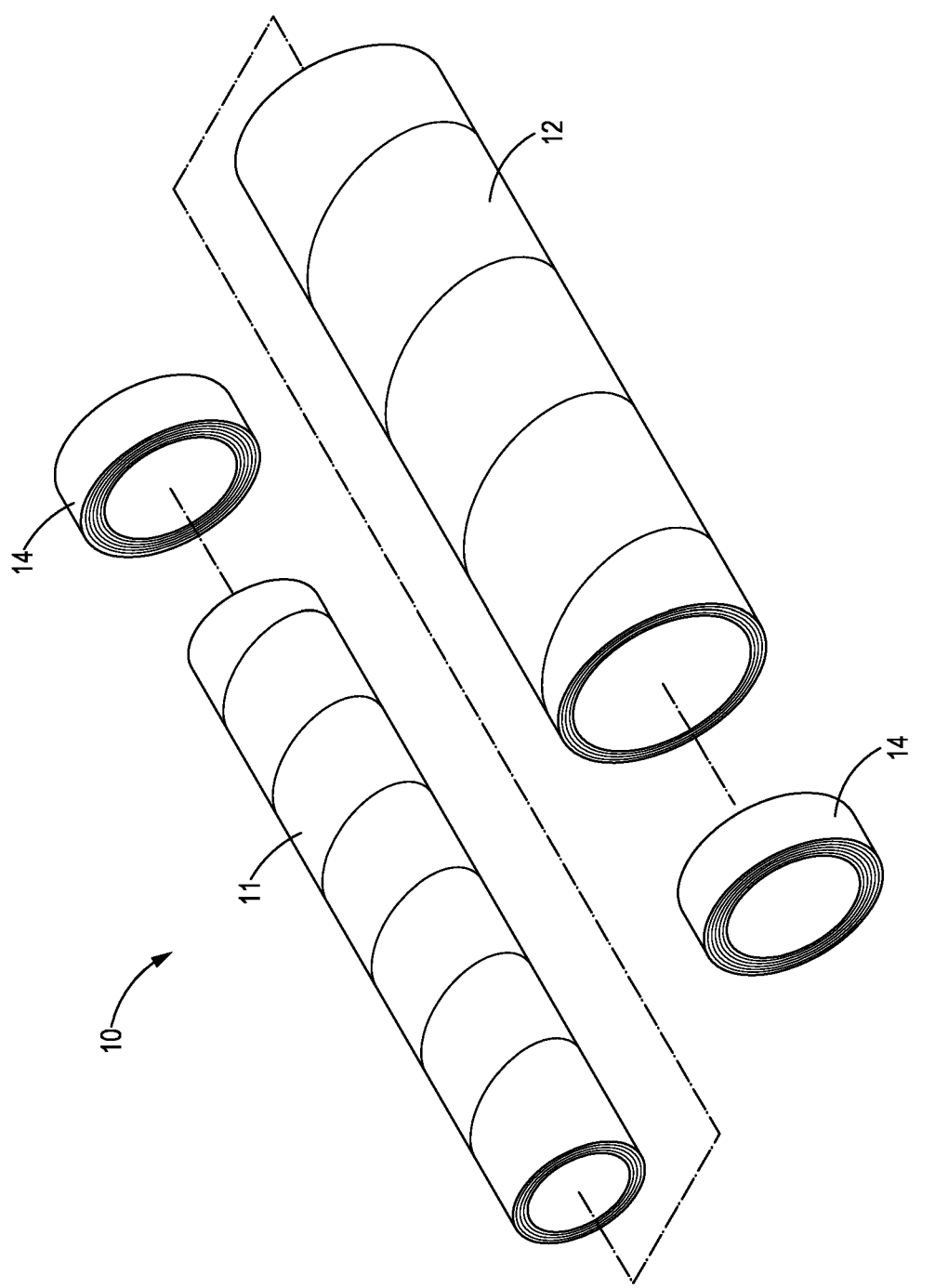
FIG. 1 is a three-dimensional exploded perspective view of a paper tube.
Figure 2:
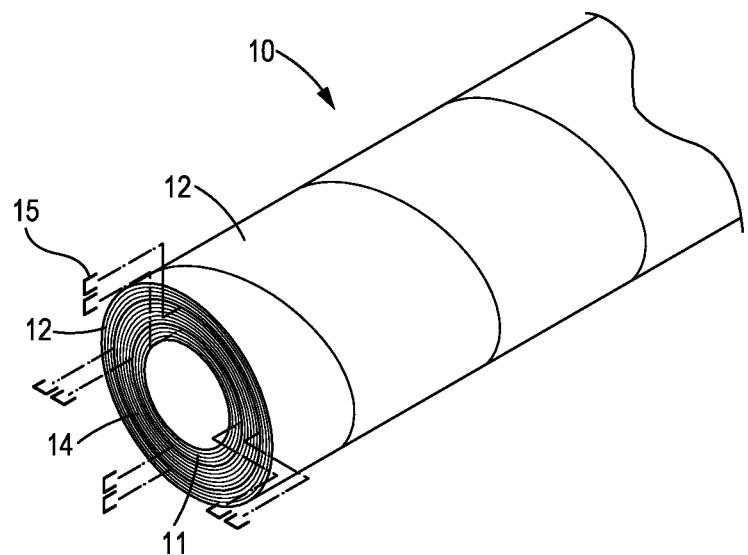
FIG. 2 is a partial three-dimensional perspective view of fixing nails nailed at one end of a paper tube.
Figure 3:
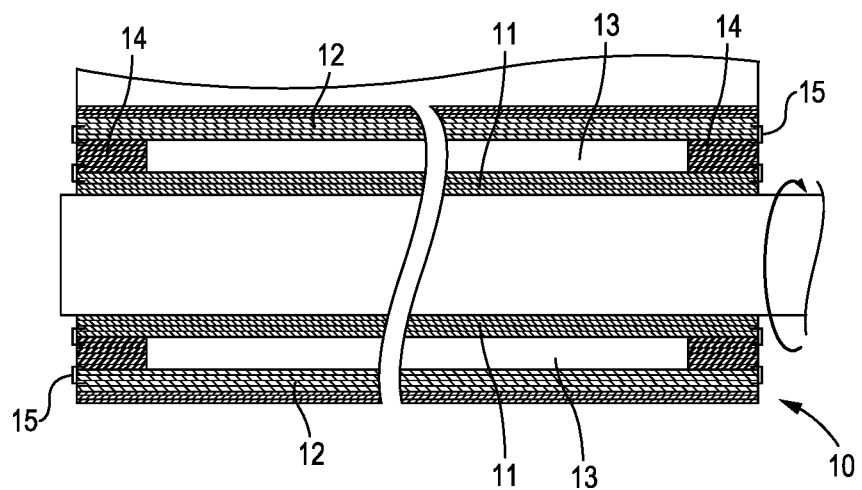
FIG. 3 is an overall cross-sectional view of the paper tube of FIG. 2 taken along an axial plane.

A paper tube structure according to the present disclosure is shown in FIGS. 1-3. The paper tube 10 comprises an inner tube 11 and an outer tube 12. The external (outer) diameter of the inner tube 11 is less than the internal (inner) diameter of the outer tube 12 such that an internal circumferential surface of the outer tube 12 and an external circumferential surface of the inner tube 11 form an annular space 13.

The structure further comprises two paper rings 14, the paper rings 14 being adhered at two ends of the annular space 13 respectively such that the two ends of the annular space 13 are closed.

The structure may further comprise fasteners such as multiple fixing nails 15, the fixing nails 15 being nailed between each paper ring 14 and the inner tube 11 and between the paper ring 14 and the outer tube 12 such that the inner tube 11, the outer tube 12 and the paper ring 14 are nailed together securely as a unit, so that the paper ring 14 can be adhered between the outer tube 12 and the inner tube 11 to increase the strength of the paper tube 10.

The paper tube 10 described above may be used for winding existing high-tech thin sheet materials, such as photosensitive films, reflective films and liquid crystal films, and has the annular space 13 due to the inner tube 11, outer tube 12 and paper ring 14 being secured together as a unit. The paper tube 10 is lightweight for winding thin sheet materials of rather heavy weight. However, in order that the paper tube 10 for winding thin sheet materials can wind a greater amount of thin sheet material, the only option is to increase the thickness of the outer tube 12 substantially, such that the load-bearing strength of the outer tube 12 is higher, and only then can a greater amount of thin sheet material be wound. However, this will greatly increase the weight of the paper tube 10, considerably marring the paper tube 10 that was originally lightweight, and despite the presence of the paper ring 14, the annular space 13 can still cause deformation of the outer tube 12. Thus there is a need for an improved core or tube.

Figure 4:
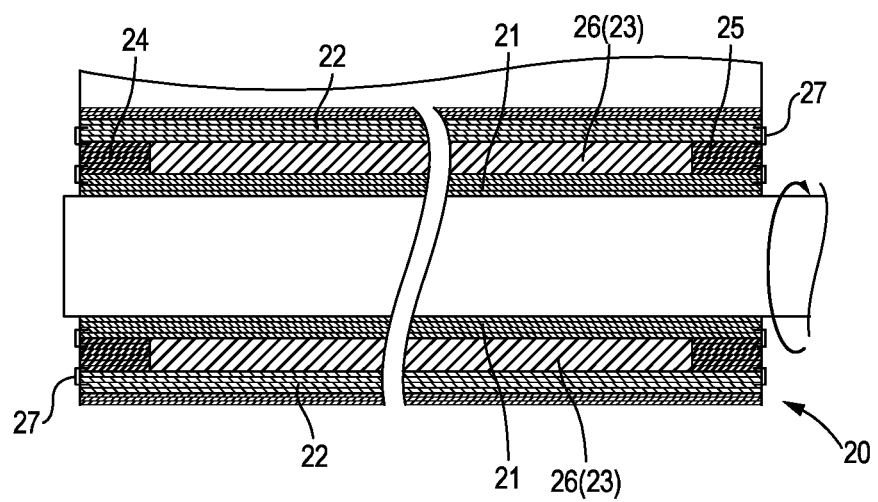
FIG. 4 is an overall cross-sectional view of a paper tube according to the disclosure taken along an axial plane.

Referring to FIG. 4, a tube 20 according to the present disclosure comprises an inner tube 21, an outer tube 22, a first paper ring 24, a second paper ring 25, a foamed body 26 and fasteners such as fixing nails 27.

The external diameter of the inner tube 21 is less than the internal diameter of the outer tube 22 such that an annular space 23 is formed between an internal circumferential surface of the outer tube 22 and an external circumferential surface of the inner tube 21. In other words, the inner tube 21 and the outer tube 22 define the annular space 23.

The first paper ring 24 and the second paper ring 25 are fitted at two ends of the annular space 23 respectively such that the two ends of the annular space 23 are closed.

The foamed body 26 is disposed within the annular space 23. The foamed body 26 may be formed by foaming and curing a mixture of a polyol and an isocyanate for a set time in the annular space 23. The annular foamed body 26 may have an annular shape and may be supported between the internal circumferential surface of the outer tube 22 and the external circumferential surface of the inner tube 21. In other words, the annular foamed body 26 may take up all of the annular space 23, contacting all or substantially all of the internal circumferential surface of the outer tube 22 and all or substantially all of the external circumferential surface of the inner tube 21, as well as all or substantially all of the inner facing (annular space facing) surfaces of the end rings 14.

At one end of the tube structure, the fixing nails 27 are separately nailed to the first paper ring 24, the inner tube 21 and the outer tube 22, such that the first paper ring 24, the inner tube 21 and the outer tube 22 are nailed together securely as a unit. At the other end of the tube structure, the fixing nails 27 are separately nailed to the second paper ring 25, the inner tube 21 and the outer tube 22, such that the second paper ring 25, the inner tube 21 and the outer tube 22 are nailed together securely as a unit.

The structure described above enables the paper tube 20 to retain a light weight, and can also enhance the loading strength of the paper tube 20, thus achieving the substantial effect of preventing deformation.

Details of the composition and function of the above embodiment are described below. Referring to FIG. 4, the inner tube 21 may be made of acrylonitrile butadiene styrene (ABS), paper or any suitable material, and the outer tube 22 may be made of acrylonitrile butadiene styrene (ABS), paper or any suitable material, but these are not limitations.

The fixing nails 27 may be staples, corrugated fasteners or any suitable fasteners for connecting and fixing the first paper ring 24 and the second paper ring 25 separately to the inner tube 21 and the outer tube 22.

The foamed body 26 disposed in the annular space 23 of the paper tube 20 may be made from a foamable material such as polyurethane (PU) in which a polyol is mixed with an isocyanate to create PU foam, but this is not a limitation. Principally, the foamable material may be foamed and cured in the annular space 23 at room temperature, with no need for any other foaming auxiliary equipment (e.g., mechanical equipment for heating or pressure reduction, etc.).

A method of filling the annular space 23 with the PU foam may comprise the following steps:

First, the first paper ring 24 is used to close one end of the annular space 23.

Next, the PU foam in which the polyol is mixed with the isocyanate is filled into the annular space 23, the filling amount thereof being an appropriate dosage calculated as being required for the annular space 23.

Then the second paper ring 25 can be used to close the other end of the annular space 23, such that both ends of the annular space 23 are closed.

Foaming of the PU foam may continue for a set time to form the foamed body 26. Generally, about 6 to 10 hours are needed. In the course of curing, the PU foam assumes an expanded state having multiple pores, such that the cured annular foamed body 26 can be supported on the internal circumferential surface of the outer tube 22 and the external circumferential surface of the inner tube 21. The annular foamed body 26 is thereby supported in the annular space 23 between the outer tube 22 and the inner tube 21, thus enhancing the loading strength of the paper tube 20.

Moreover, compared with the known practice of increasing the thickness of the outer tube 22, the weight of the annular foamed body 26 is much lower than the weight of the outer tube 22 of increased thickness. In this way, it is possible to achieve the substantial effect of making the paper tube 20 lightweight while being able to increase strength, to achieve the effect of avoiding deformation of the paper tube 20. Furthermore, by varying the amount of isocyanate mixed in the PU foam, the density of the annular foamed body 26 can be changed, i.e. the hardness of the annular foamed body 26 can be adjusted. The blend can be changed appropriately according to the requirements for the weight of thin sheet material wound on the paper tube 20. For example: for winding 400 kg of thin sheet material, the annular foamed body 26 of the paper tube 20 has a lower density requirement, whereas for winding 600 kg of thin sheet material, the annular foamed body 26 of the paper tube 20 has a higher density requirement. Thus there is the effect of being able to change the density of the annular foamed body 26 according to requirements.

The embodiment above is merely a preferred embodiment cited in order to fully explain the present invention, and is not intended to limit the features of the present invention. All further inventions that utilize the technical approach and principles of innovation associated with the present invention shall still fall within the scope of equivalent structural innovation of the present invention.

The invention claimed is:

1. A lightweight tube structure comprising:
    an inner tube and an outer tube, the inner tube having an external circumferential surface and an external diameter, the outer tube having an internal circumferential surface and internal diameter, the external diameter of the inner tube being less than the internal diameter of the outer tube;
    the inner tube and the outer tube defining an annular space between the internal circumferential surface of the outer tube and the external circumferential surface of the inner tube, the annular space having two ends;
    a first paper ring and a second paper ring, the first paper ring and the second paper ring disposed at the two ends of the annular space respectively such that the two ends of the annular space are closed.

2. The lightweight tube structure of claim 1, further comprising:
    a foamed body disposed in the annular space and having an annular shape, the foamed body being supported between the internal circumferential surface of the outer tube and the external circumferential surface of the inner tube.

3. The lightweight tube structure of claim 2, wherein:
    the foamed body is formed by foaming and curing of a mixture of a polyol and an isocyanate for a set time in the annular space.

4. A method of making the lightweight paper tube structure of claim 2, comprising the steps of:
    closing one end of the annular space with the first paper ring;
    partially filling the annular space with a mixture of polyol and isocyanate in an amount calculated to fill the annular space with foam;
    after the filling step, closing the other end of the annular space with the second paper ring; and
    foaming the mixture to form a foamed body supported in the annular space between the outer tube and the inner tube.

5. The lightweight tube structure of claim 1, further comprising:
    first multiple fasteners separately affixed to the first paper ring, the inner tube and the outer tube such that the first paper ring, the inner tube and the outer tube are fastened together securely as a unit; and
    second multiple fasteners separately fastened to the second paper ring, the inner tube and the outer tube, such that the second paper ring, the inner tube and the outer tube are fastened together securely as a unit.

6. The lightweight tube structure of claim 1, wherein:
the first paper ring and the second paper ring are disposed entirely within the annular space.

7. The lightweight tube structure of claim 1, wherein:
the inner tube is a paper inner tube and the outer tube is a paper outer tube.

* * * * *